United States Patent
Wang (10) Patent No.: US 6,377,414 B1
(45) Date of Patent: Apr. 23, 2002

(54) MAGNETIC MEDIA PATTERNING UTILIZING HEAT-INDUCED PHASE TRANSITION

(75) Inventor: Li-Ping Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/708,604

(22) Filed: Nov. 9, 2000

Related U.S. Application Data (60) Provisional application No. 60/165,284, filed on Nov. 12, 1999.

(51) Int. Cl.$^7$ .................................................. G11B 5/02
(52) U.S. Cl. ...................... 360/59; 360/131; 369/13.14; 369/13.41; 369/13.51
(58) Field of Search .............................. 360/59, 55, 57, 360/66, 114, 131, 135; 428/694 R; 369/13, 14, 101, 13.01, 13.14, 13.35, 13.38, 13.46, 13.51

(56) References Cited

U.S. PATENT DOCUMENTS 4,733,385 A * 3/1988 Henmi et al. .................. 369/13
5,629,909 A * 5/1997 Shiratori ...................... 360/59

FOREIGN PATENT DOCUMENTS

| EP | 0657884 A1 | 6/1995 |
|----|-----------|--------|
| JP | 62-043816 | 2/1987 |
| JP | 62-192025 | 8/1987 |
| JP | 09-297918 | 11/1997 |
| JP | 10-269502 | 9/1998 |

OTHER PUBLICATIONS

"Patterned media: Giant step in magnetic storage?", by Todorovic et al, Data Storage, pp. 17–20, published May, 1999.*

"AFM–based storage: Route to ultra–high areal densities?", by Terris et al, Data Storage, pp. 21–26, published Aug. 1998.*

L. Maya et al, "Thermal conversion of an iron nitride–silicon nitride precursor into a ferromagnetic nanocomposite", Jan. 15, 1988, pp 905–910, J. Chem. Phys.

Stephen Y. Chou, "Patterned Magnetic Nanstructures and Quantized Magnetic Disks", Apr. 1997, pp. 652–671, Proceedings of the IEEE, vol. 85. No. 4.

* cited by examiner

*Primary Examiner*—Alan T. Faber
(74) *Attorney, Agent, or Firm*—McDermott, Will & Emery (57) ABSTRACT

Patterned magnetic media are provided at high resolution and pattern definition by a process comprising steps of: applying to a magnetic layer a first uniform magnetic field of a first direction and strength to pre-align the magnetic grains thereof; applying a second uniform magnetic field of a second, opposite direction and of lesser strength than the first magnetic field, sufficient to change the alignment of the magnetic grains only when the temperature thereof is equal to or greater than the Curie temperature $T_c$; selectively increasing the temperature of a pattern of selected surface areas of the magnetic layer to at least $T_c$ for an interval while applying the second magnetic field to thereby selectively change the alignment of the magnetic grains of the selectively heated surface areas; terminating application of the second magnetic field after completion of the selective realignment; and cooling the selectively heated surface areas to a temperature below $T_c$, whereby the magnetic pattern is preserved in the magnetic layer.

19 Claims, 2 Drawing Sheets

FIG. 1

FIG. 2

MAGNETIC MEDIA PATTERNING UTILIZING HEAT-INDUCED PHASE TRANSITION

CROSS-REFERENCE TO RELATED APPLICATIONS

This application claims priority under from U.S. Provisional Patent Application No. 60/165,284 filed Nov. 12, 1999, the entire disclosure of which is incorporated herein by reference, and International Application No. PCT/US00/30717 filed Nov. 9, 2000.

FIELD OF THE INVENTION

The present invention relates to an improved method for patterning magnetic data/information recording, storage, and retrieval media as well as improved magnetic recording media obtained thereby. More specifically, the present invention relates to an improved method for patterning magnetic media in hard disk form such as are utilized in computer and computer-related applications.

BACKGROUND OF THE INVENTION

Magnetic media are widely utilized in various applications, particularly in the computer industry, and efforts are continually made with the aim of increasing the areal recording density, i.e., the bit density, or bits/unit area, of the magnetic media. Conventional magnetic thin-film media, wherein a fine-grained polycrystalline magnetic alloy layer serves as the active recording medium layer, are typically formed as "perpendicular" or "longitudinal" media depending upon the direction of magnetization of the grains. In this regard, "perpendicular" recording media have been found superior to the more common "longitudinal" media in achieving very high bit densities. However, as grain sizes decrease in order to achieve increased recording bit densities, e.g., to about 20 $Gb/in^2$, effects arising from thermal instability, such as "superparamagnetism" are encountered. One proposed solution to the problem of thermal instability, including, inter alia, the so-called "superparamagnetic limit" encountered with ultra-high recording density magnetic recording media, is to increase the crystalline anisotropy, and thus the squareness of the bits, in order to compensate for the smaller grain sizes.

An alternative approach, however, to the formation of very high bit density magnetic recording media, is the formation of "patterned" media. Analogous to the situation with conventional polycrystalline thin-film magnetic media, both "longitudinal" and "perpendicular" types of patterned magnetic media have been developed, depending upon whether the magnetization direction is parallel or perpendicular to the media surface. When fabricated in disk form, such "patterned" media are readily adapted for use in conventional hard drives, with most of the drive design features remaining the same. Thus, hard drive-based "patterned" media technology would, in practice, comprise a spinning disk with a slider head flying above it in closely-spaced relation thereto, with read sensors or a read/write head that magnetizes and/or detects the magnetic fields emanating from the magnetic media.

According to a first approach, as exemplified by the Atomic Force Microscopy ("AFM") approach of IBM (B. Terris et al., *Data Storage,* August 1998, pp. 21–26), a sharp tip is utilized for scanning extremely close to the surface of a data/information storage medium. The tip is located at the end of a flexible cantilever, which deflects in response to changes in the force imposed on the tip during scanning. The force may arise from a variety of effects, including, inter alia, magnetic force. To date, only two types of AFM drives have been demonstrated, i.e., write-once/read-only and read-only. The former type of AFM drive, which provides write-once/read-only capability, utilizes a heated AFM tip for writing once by forming small indentations or pits in the surface of a substrate, e.g., of polycarbonate. Data is read by using the AFM tip to scan the thus-indented surface and sensing the changes in the force imposed on the AFM tip due to the presence of the indentations.

The latter type of AFM drive functions in a read-only mode, and data is initially written in the form of indentations (pits) which are created in the surface of a $SiO_2$ master by means of an electron beam. The data, in the form of the indentations, is then transferred, by replication, to a photopolymer-coated glass substrate, which photopolymer is cured by exposure to ultra-violet (UV) radiation to thereby form a surface topography representing the data. The data is then read from the cured photopolymer surface by scanning with the AFM tip to sense the changes in force thereat due to the indentations.

According to the second, lithographic approach, thin film processes such as are utilized in the fabrication of semiconductor integrated circuits including micron-sized features are adapted for making high aspect ratio, single column/bit, perpendicularly patterned media. According to one particular approach (M. Todorovic et al., *Data Storage,* May 1999, pp. 17–20) designed to increase coercivity, hence stability of the individual columns, electroplated nickel (Ni) is utilized for forming the columns, and gallium arsenide (GaAs) and alumina ($Al_2O_3$) are employed as embedding media for the columns. The fabrication process starts with an electrically conductive GaAs substrate, on which thin layers of aluminum arsenide (AlAs) and GaAs are successively deposited, as by molecular beam epitaxy ("MBE"). Scanning electron beam lithography is then utilized to define the magnet patterns on the resin-coated sample. The patterns in the e-beam-exposed resin are developed utilizing an appropriate solvent system and then transferred, as by chemically-assisted ion beam etching ("CAIBE"), into the AlAs/GaAs layers. After pattern definition, the AlAs layer is converted into $Al_2O_3$ by wet thermal oxidation. The thus-produced patterned layer acts as a mask for additional etching for extending the pattern of depressions perpendicularly into the GaAs substrate. The etched depressions in the $Al_2O_3$ substrate are then filled with electroplated Ni. Overplated Ni "mushrooms" are then removed, as by polishing, to create a smooth surface for accommodating slider contact therewith.

Thus, the overall process sequence for forming such media requires successive, diverse technology steps for (1) MBE growth and mask deposition; (2) electron beam lithography; (3) chemically-assisted ion beam etching; (4) wet thermal oxidation; and (5) electroplating and polishing, e.g., chemical-mechanical polishing ("CMP"). The result is a complex and time-consuming fabrication process. Moreover, each of the above-described approaches for patterned media manufacture typically involves substantial capital investment for the process equipment, which together with the inherent process complexity, render them too costly for use in high product throughput magnetic disk media manufacture.

Yet another process for forming patterned magnetic media, which process is also useful in forming servo patterns on a magnetic media surface, is disclosed by D. S. Kuo in commonly assigned, co-pending U.S. patent application Ser. No. 09/130,657, filed Aug. 7, 1998, and is based upon the well-known property or phenomenon of magnetic films of exhibiting a decrease in coercivity ($H_c$) with increase in temperature. Such decrease in $H_c$, with increase in temperature is currently utilized to produce magnetic transitions in thermomagnetic materials, e.g., rare earth-transition metal ("RE-TM") materials, such as terbium-iron (TbFe) films utilized in magneto-optical ("MO") recording devices. Such devices typically employ a focussed laser beam for creating a "hot spot" on the RE-TM-based media surface, while simultaneous application of an external magnetic field is applied to the media to reverse the direction of local magnetization within the locally heated area.

Based upon this effect or phenomenon, Kuo has proposed, in the above-mentioned U.S. patent application, a method for forming patterned magnetic media, e.g., servo patterns in the surface of a magnetic recording layer. According to the process disclosed therein, instead of heating the magnetic media with a spot of focussed laser radiation, a focussed pattern (i.e., an image) of radiative energy (e.g., from a laser) is projected onto the surface of a magnetic recording film or layer, which film or layer has been subjected to a pre-alignment treatment by application of a strong magnetic field of a first polarity, to selectively heat and thus lower the coercivity $H_c$ of the magnetically pre-aligned film at the exposed areas. In order to generate a magnetic pattern in the magnetically pre-aligned film or layer, a reverse polarity, weaker magnetic field is applied (from an external source) to the film surface during the exposure/heating process, the reverse polarity, weaker magnetic field having a strength between the coercivity of the magnetic film when at ambient room temperature (i.e., when cold) and when under selective radiative energy exposure (i.e., when hot). The direction or orientation of magnetization of the magnetic film or layer at the selectively heated areas corresponding to the exposure pattern is reversed due to the application of the reverse polarity magnetic field during the pattern exposure/selective heating stage. As a consequence, a magnetic pattern is formed in the magnetic film or layer, which pattern is retained upon subsequent cooling of the selectively exposed portions of the film or layer.

While the feasibility of the above concept or process has been demonstrated in laboratory studies, obtainment of patterns exhibiting high quality magnetic transitions has been problematic, for several reasons, including:

(1) Transition sharpness and signal strength-adaptation of the essential data recording concept utilized with RE-TM thermomagnetic materials and media, such as of TbFe, to magnetic recording media utilizing thin films or layers of conventional magnetic alloys comprised of iron (Fe), cobalt (Co), nickel (Ni), chromium (Cr), platinum (Pt), etc., incurs a complication in that although the coercivity $H_c$ of the latter-mentioned magnetic materials decreases with increase in temperature, the anisotropy constant $K_u$ also decreases with increase in temperature. As a consequence, the combined effect of a decrease in $H_c$ and $K_u$ with increase in temperature is disadvantageous in several respects, including formation of wide transitions between the patterned and non-patterned areas; a wide pulse width at 50% of peak signal amplitude ("PW 50"); and weak signal strength.

(2) Magnetic pattern uniformity—the shape of the transition patterns between areas of different magnetic orientation is determined by the temperature distribution of the selectively heated areas of the magnetic film or layer resulting from the heating by radiative (e.g., laser) energy. The temperature vs. distance along the film surface profile can vary from area-to-area due to several factors. For example, the radiative energy supplied to the various selected areas of the pattern can vary due to pulse-to-pulse energy variation of the laser, such that even if the image geometry is quite uniform over the film surface, the resulting magnetic transition patterns can exhibit substantial variation is both size and shape. In addition, since the coercivity $H_c$, of as-deposited magnetic alloy films or layers typically varies by about +/−10% over a disk surface, pattern uniformity and signal strength will necessarily vary over the magnetic layer area.

(3) Dynamic coercivity—the magnetic switching or transition time is determined primarily by the length of the cooling interval of the thermal cycle (i.e., the combination of heating and cooling times) experienced by the magnetic film or layer. In order to form a magnetic pattern with sharp magnetic transitions, it is necessary to generate a heating pattern of the selected areas which has a large temperature gradient near the edges thereof. To achieve this, a short thermal cycle is required in order to minimize expansion (e.g., widening) of the temperature profile resulting from thermal conduction in the magnetic film or layer. However, as the duration of the thermal cycle decreases, the coercivity of the magnetic film or layer corresponding to the cycle (i.e., switching) time, termed the "dynamic coercivity", increases. Consequently, an upper limit is imposed on how rapidly the magnetic film or layer can be heated without incurring significant dynamic coercivity effects. The same upper limit determines the minimum amount of expansion (i.e., widening) of the temperature vs. distance along the film surface profile for a finite heating interval.

Accordingly, there exists a need for an improved method for forming magnetic patterns in magnetic data/information storage and retrieval media, such as hard disks, which is free of the disadvantages and drawbacks associated with the above-described process, and which can be implemented at a manufacturing cost which is lower than, or at least compatible with, that of conventional manufacturing methodologies and technologies for forming patterned magnetic media. There also exists a need for improved patterned magnetic media, e.g., in disk form, which exhibit uniformly shaped and very sharply defined magnetic patterns, such as are employed for servo patterns of thin film magnetic media.

The present invention, therefore, addresses and solves problems attendant upon patterned magnetic media manufacture according to the above-described process, and affords rapid, cost-effective fabrication of high bit density, patterned magnetic media, e.g., in the form of hard disks, while providing substantially full compatibility with all mechanical and electrical aspects of conventional hard disk technology. Moreover, the patterned magnetic media of the present invention can be simply and reliably manufactured by suitable adaptation and/or modification of conventional manufacturing techniques and apparatus.

DISCLOSURE OF THE INVENTION

An advantage of the present invention is an improved method of forming a magnetic pattern in a magnetic data/information storage and retrieval medium.

Another advantage of the present invention is an improved magnetically patterned magnetic data/information storage and retrieval medium.

Yet another advantage of the present invention is an improved apparatus for forming a magnetic pattern in a magnetic data/information storage and retrieval medium.

Additional advantages, aspects, and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of forming a magnetic pattern in a magnetic data/information storage and retrieval medium, which method comprises the steps of:

(a) providing a magnetic medium including a magnetic recording layer having a surface, the magnetic recording layer comprising a magnetic material having a Curie temperature ($T_c$) substantially above room temperature;

(b) applying to the magnetic layer a first uniform magnetic field of a first direction and strength sufficient to substantially uniformize the magnetic state thereof;

(c) applying to the magnetic layer a second uniform magnetic field of a second direction opposite to and of lesser strength than that of the first magnetic field, the strength of the second magnetic field being sufficient to alter the magnetic state of the magnetic layer when the latter is at a first, elevated temperature equal to or greater than $T_c$ but insufficient to alter the magnetic state of the magnetic layer when the latter is at a second, lower temperature below $T_c$;

(d) selectively increasing the temperature of at least one selected portion of the surface area of the magnetic layer to at least $T_c$ for a desired interval, while applying the second magnetic field to the magnetic layer, thereby selectively altering the magnetic state of the at least one selected portion of the magnetic layer;

(e) terminating application of the second magnetic field to the magnetic layer after completion of step (d); and (f) cooling the at least one selected portion of the magnetic layer to a temperature below $T_c$.

According to embodiments of the present invention, step (a) comprises providing a longitudinal or perpendicular magnetic medium, e.g., a disk-shaped medium including a disk-shaped substrate supporting the magnetic layer, wherein the magnetic layer is comprised of a magnetic alloy including metals selected from the group consisting of Fe, Co, Ni, Cr, and Pt, and $T_c$ of the magnetic alloy is on the order of about 300° C.; step (b) comprises substantially uniformizing the magnetic state of the magnetic layer by pre-aligning the magnetic regions thereof, e.g., by performing a DC erase by applying the first uniform magnetic field as a DC magnetic field directed along the easy axis of magnetization of the magnetic layer, the magnetic field strength of the first magnetic layer being substantially greater than the Dc coercivity of the magnetic layer at room temperature and the first magnetic field being applied to the entire surface of the magnetic layer for a desired interval; step (c) comprises applying the second uniform magnetic field of direction opposite to the first magnetic field at a strength which is lower than but close to that where lowering of the magnetization of the magnetic layer occurs as the temperature of the magnetic layer approaches $T_c$ and may, for example, be determined by use of the following equation for magnetic materials with constant squareness (S) values:

$$\frac{H_c(dM/dH)_{Hc} - M_r}{(dM/dH)_{Hc} - (dM/dH)_0}$$

where $H_c$=coercivity (Oe); M=magnetization (emu/mm$^3$); $M_r$=remanent magnetization; and subscript 0=zero applied magnetic field; step (d) comprises raising the temperature of a patterned plurality of selected portions of the surface of the magnetic layer to at least $T_c$, e.g., by selectively exposing the patterned plurality of portions of the magnetic layer to radiative energy, by generating a pattern of radiative energy for selectively exposing the patterned plurality of portions by projecting a focussed image on the selected portions of the surface of the magnetic layer via photolithographic techniques, by contact/proximity imaging through a patterned aperture mask, or by near field imaging, wherein step (d) comprises utilizing a source of radiative energy selected from among optical (e.g., continuous or pulsed lasers), electron beam, and ion beam sources and performing raster scanning or area imaging of the magnetic layer surface; and step (e) comprises rapidly cooling the at least one selected portion by at least one process selected from convection, conduction, and heat transfer.

According to another aspect of the present invention, a patterned magnetic medium comprises:

(a) a substrate; and (b) a patterned magnetic recording layer on the substrate, the patterned magnetic recording layer having a Curie temperature ($T_c$) substantially above room temperature and a surface comprising a magnetic pattern formed therein by a process comprising the steps of:

i. applying to the easy axis of the magnetic layer a first uniform magnetic field of a first direction and having sufficient strength to substantially uniformize the magnetic state of the magnetic layer by pre-alignment of the magnetic regions thereof;

ii. applying to the magnetic layer a second uniform magnetic field of a second direction opposite to and having a strength less than that of said first magnetic field, the strength of the second magnetic field being sufficient to alter the alignment of the magnetic regions of the magnetic layer when the latter is at a first, elevated temperature equal to or greater than $T_c$ but insufficient to alter the alignment of the magnetic regions of the magnetic layer when the latter is at a second, lower temperature below $T_c$;

iii. selectively increasing the temperature of a patterned plurality of selected portions of the magnetic layer to at least $T_c$ for a desired interval while applying the second magnetic field to the magnetic layer, thereby selectively altering the magnetic alignment of the magnetic regions of the patterned plurality of selected portions of the magnetic layer;

iv. terminating application of the second magnetic field to the magnetic layer after completion of step iii.; and v. cooling the patterned plurality of selected portions of the magnetic layer to a temperature below $T_c$.

According to embodiments of the present invention, the patterned magnetic medium comprises a disk-shaped substrate and a longitudinal or perpendicular magnetic recording layer comprised of an alloy of elements selected from Fe, Co, Ni, Cr, and Pt and having a $T_c$ on the order of about 300°C.

According to yet another aspect of the present invention, a system for forming a magnetic data/information storage and retrieval medium having a patterned magnetic recording layer comprises:

means for applying a magnetic field to a magnetic recording layer having a Curie temperature ($T_c$) which is substantially above room temperature; and means for forming a magnetic pattern in said magnetic layer by selectively increasing the temperature of a selected plurality of portions of the magnetic layer to at least $T_c$ for a desired interval.

According to embodiments of the present invention, the means for applying a magnetic field to the magnetic recording layer comprises magnet means for applying a uniform magnetic field of a desired direction and having a strength sufficient to alter the magnetic state of the magnetic layer when the latter is at a first, elevated temperature at or above $T_c$ but insufficient to alter the magnetic state of the magnetic layer when the latter is at a second, lower temperature below $T_c$; and the means for forming the magnetic pattern includes a radiative energy source for selectively increasing the selected plurality of portions of the magnetic layer to a temperature of $T_c$ or above.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of an embodiment of the invention can best be understood when read in conjunction with the following drawings, in which the various features are not necessarily drawn to scale but rather are drawn as to best illustrate the pertinent features, and in which like reference numerals are employed throughout to designate like features, wherein.

DESCRIPTION OF THE INVENTION

The present invention has, as a principal aim, provision of a simple, convenient, and reliable method for forming magnetic patterns within the surfaces of magnetic recording layers, for use in manufacturing high areal recording density data/information recording, storage and retrieval media for operation with conventional disk drive technology, and which may include servo patterns formed by the inventive methodology. The present invention relies largely upon techniques, methodologies, and instrumentalities currently utilized (or modified according to the requirements of the present invention) in the manufacture of magnetic media. The invention also has, as a principal aim, provision of improved high areal recording density patterned magnetic data/information recording, storage and retrieval media, e.g., hard disks, which can be manufactured at a cost compatible with that of conventional magnetic media.

The present invention is based upon the discovery that formation of high pattern definition patterned magnetic media can be accomplished according to a method which is substantially free of the above-described disadvantages and drawbacks of the method disclosed in co-pending U.S. patent application Ser. No. 09/130,657 of Kuo. The inventive methodology can be applied to longitudinal or perpendicular recording media and comprises increasing the temperature of the pattern of selectively heated portions of the magnetic layer to at least the Curie temperature ($T_c$), i.e., the temperature at which the magnetic material undergoes a phase transition from ferromagnetism (i.e., $H_c$ is finite) to paramagnetism (i.e., $H_c=0$). In this regard, the method of the present invention differs in essential respect from that of Kuo in that the lower heating temperatures of the latter necessitates reliance upon a reduction in coercivity ($H_c$) within a single ferromagnetic phase, rather than a higher heating temperature facilitating utilization of a transition between two distinct magnetic phases (i.e., ferromagnetic and paramagnetic phases).

More specifically, the inventive process relies upon a sequence of steps similar to that of Kuo, with the following considerations being of significance in achieving sharp transitions between patterned and non-patterned areas of the magnetic film leading to high pattern resolution:

(1) Pre-alignment of the magnetic grains or regions—according to the present invention, pre-alignment of the magnetic grains or regions of the magnetic film or layer is performed by a process termed "DC erase", wherein a uniform, high strength DC magnetic field is applied to the surface of the magnetic film or layer along the easy axis of magnetization of the magnetic film or layer. The DC magnetic field applied during this step must be of a strength substantially above the DC coercivity of the magnetic film or layer at normal room temperatures (i.e., from about 18 to about 25° C.) in order to achieve effective magnetic saturation. The strength of the applied magnetic field should be at least about 20% higher than $H_c$ and is typically in the range of from about 4 to about 5 times the coercivity of the magnetic material, e.g., a magnetic alloy of metals selected from the group consisting of Fe, Co, Ni, Cr, and Pt. It is essential that the magnetic field cover the entire surface of the magnetic layer or film during its application, and, for longitudinal recording media, the direction of the applied alignment field must be along the circumferential direction.

(2) Reverse magnetic field—subsequent to performing the magnetic pre-alignment step described above, a uniform magnetic field of direction or polarity opposite to that of the pre-alignment magnetic field ("reverse bias magnetic field") and of lower strength set to be lower than but near the field strength before significant lowering of the magnetization of the magnetic material of the magnetic film or layer occurs. For example, for magnetic materials having substantially constant squareness values S and S* (where S is equal to the remanent magnetization $M_r$ divided by the saturation magnetization $M_s$, and S* is equal to the remanent coercivity $H_r$ divided by $H_c$), the strength of the reverse magnetic field can be set to be below, but close to, that determined by the following formula:

$$\frac{H_c(dM/dH)_{Hc} - M_r}{(dM/dH)_{Hc} - (dM/dH)_0}$$

where $H_c$=coercivity (Oe); M=magnetization (emu/mm$^3$); $M_r$=remanent magnetization; and subscript 0=zero applied magnetic field.

The reverse magnetic field is utilized for altering the alignment of the magnetic domains or regions of a pattern of selectively heated portions of the magnetic film or layer in the next step of the inventive process sequence.

(3) Generation of magnetic phase pattern—magnetic patterns are generated in the magnetic film or layer by selectively changing the magnetic phase of selected portions thereof (forming a desired pattern) from a ferromagnetic phase, with a finite $H_c$, to a paramagnetic phase, with $H_c=0$, by rapidly heating the selected portions by means of absorption of radiative energy from a high intensity source, e.g., a laser, such as a continuous wave laser with a beam modulated into short pulses or a pulsed laser; an electron beam source, or an ion beam source. For example, with conventional thin film magnetic media comprising magnetic alloy materials including metals selected from among Fe, Co, Ni, Cr, and Pt, the radiative energy source must be of sufficient energy to rapidly increase the selected portions of the magnetic film from room temperature (i.e., from about 18 to about 25° C.) to a Curie temperature ($T_c$) on the order of about 300° C. The pattern of selectively heated portions can be generated by use of a focused, projected image utilizing, e.g., photolithographic techniques, or by use of contact/proximity imaging or near-field techniques utilizing a pulsed laser (for example, providing short wavelength pulses of about 10 ns duration) as the radiative energy source. In any case, transfer of the desired pattern to the surface of the magnetic layer can be achieved by raster-type scanning of the surface or by sequential imaging of discrete surface areas of the magnetic layer. When the temperature of the selected portions of the magnetic layer reaches at least the Curie temperature ($T_c$) of the particular magnetic material, typically about 300° C. in the case of conventional ferromagnetic metal-based alloys, the coercivity ($H_c$) of the selected portions becomes zero and the magnetic material thereat undergoes a second-order phase transition from being ferromagnetic to being paramagnetic. As a consequence, the heating of selected portions of the magnetic film or layer results in a pattern of paramagnetic film portions or areas within a complementary larger area pattern of a pre-aligned ferromagnetic film or layer. In the presence of the reverse bias magnetic field (described supra), the thus-produced pattern of heated paramagnetic portions of the magnetic film or layer become magnetically oriented according to the direction of the applied reverse bias magnetic field, whereas the unheated, ferromagnetic areas of the magnetic film or layer are unaffected by the lower strength reverse bias magnetic field.

(4) The thus-formed magnetic phase transition pattern is preserved by rapidly cooling the pattern of selectively heated portions of the magnetic film or layer to a temperature below $T_c$, whereupon each of the selected portions forming the magnetic phase pattern returns to the ferromagnetic state, at which time the magnetic pattern consists of selected portions of the magnetic film or layer having magnetic domains which have a magnetic alignment or orientation opposite that of the surrounding (i.e., bulk) areas. Typically, the selected portions of the magnetic film or layer cool down from the $T_c$ to room temperature by convection and/or conduction. However, the cooling rate can be enhanced by providing an active heat transfer means such as a heat sink or other cooling means.

The above-described process can be used for forming magnetic patterns in the surfaces of both longitudinally and vertically (i.e., perpendicularly) oriented magnetic films. Since the transitions are defined by a transition of magnetic phase (i.e., from ferromagnetic to paramagnetic, and vice versa) rather than by a difference (i.e., reduction/increase) in coercivity within a single phase, the process is essentially free from the disadvantageous effects resulting from the concomitant decrease in anisotropy constant $K_u$. As a consequence, very sharp transitions are possible according to the inventive methodology, and, since the magnetic phase transition is defined by the Curie temperature ($T_c$) isotherm instead of the entire temperature distribution, the requirements on laser pulse energy/power stability can be less demanding than the process based upon coercivity change (i.e., reduction) within a single magnetic phase.

Figure 1:
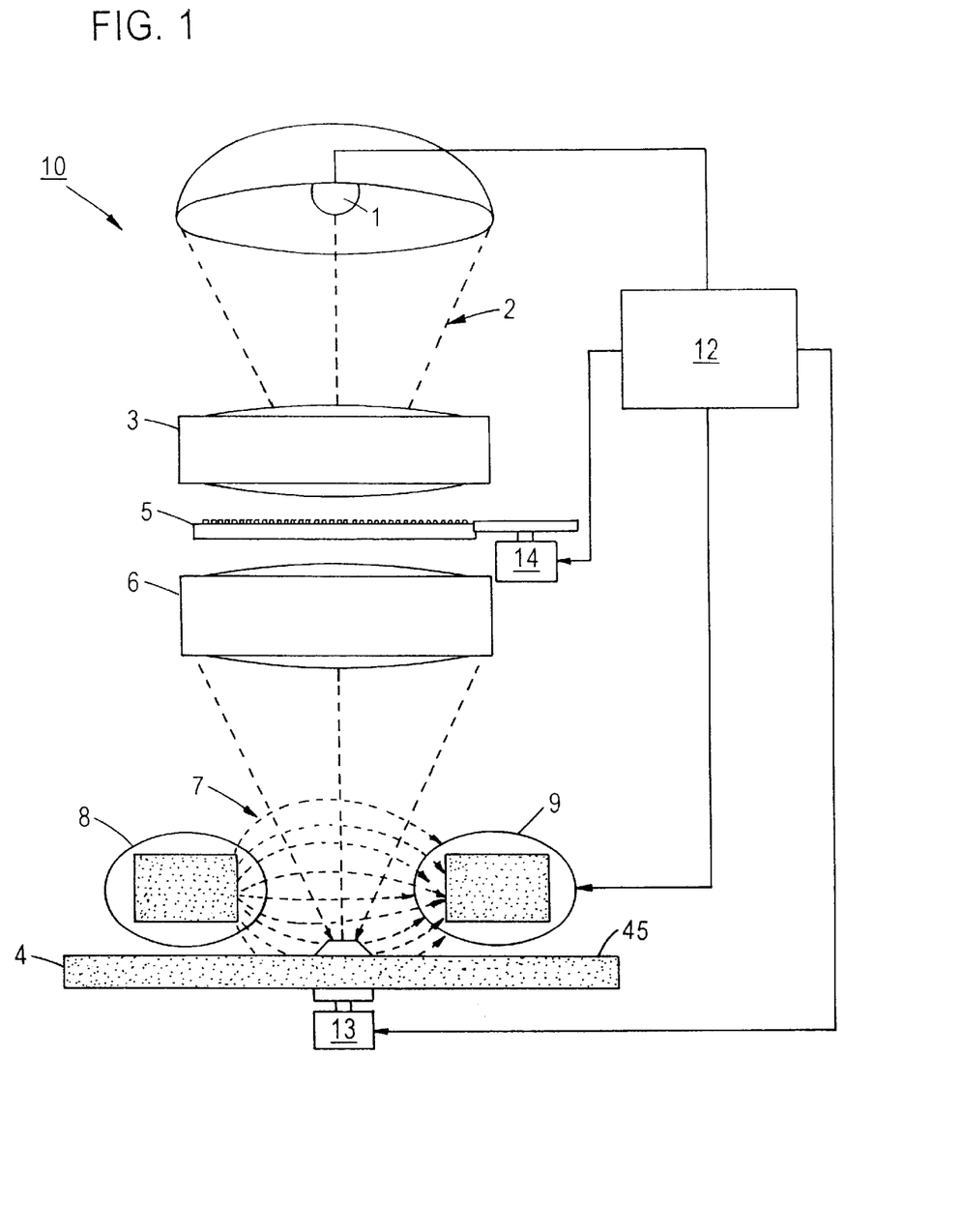
FIG. 1 is a simplified, schematic cross-sectional view of an exemplary apparatus for practicing the method of the present invention.

Referring now to FIG. 1, shown therein is a simplified, schematic cross-sectional view of an exemplary lens-projection type magnetic pattern-forming system 10 according to an embodiment of the present invention. As illustrated, system 10 comprises a source 1 of radiative energy 2 (e.g., a pulsed laser) and a focussing means 3 (e.g., a lens) for supplying the radiative energy 2 at an intensity sufficient to rapidly increase the temperature of selected surface areas 4S of a thin-film magnetic medium 4, e.g., in the form of a disk, to a temperature at or above the Curie temperature ($T_c$) of the medium, i.e., typically on the order of at least about 300° C. for transition metal-based ferromagnetic thin films. The focussed radiative energy 2 is then directed by means of lens 3 through a patterned mask 5 (corresponding to the magnetic pattern desired to be formed) and onto the selected surface areas 4S of magnetic disk 4 by means of projection lens 6. Mask 5 includes opaque regions that substantially block transmission of radiative energy 2 (e.g., laser light) from source 1 while the transparent regions of the mask 5 permit radiative energy 2 to pass therethrough. The opaque and transparent regions of mask 5 form an image of the desired magnetic pattern, e.g., a formatting pattern, which is projected by lens 6 onto the selected surface areas 4S of the magnetic disk 4.

Figure 2:
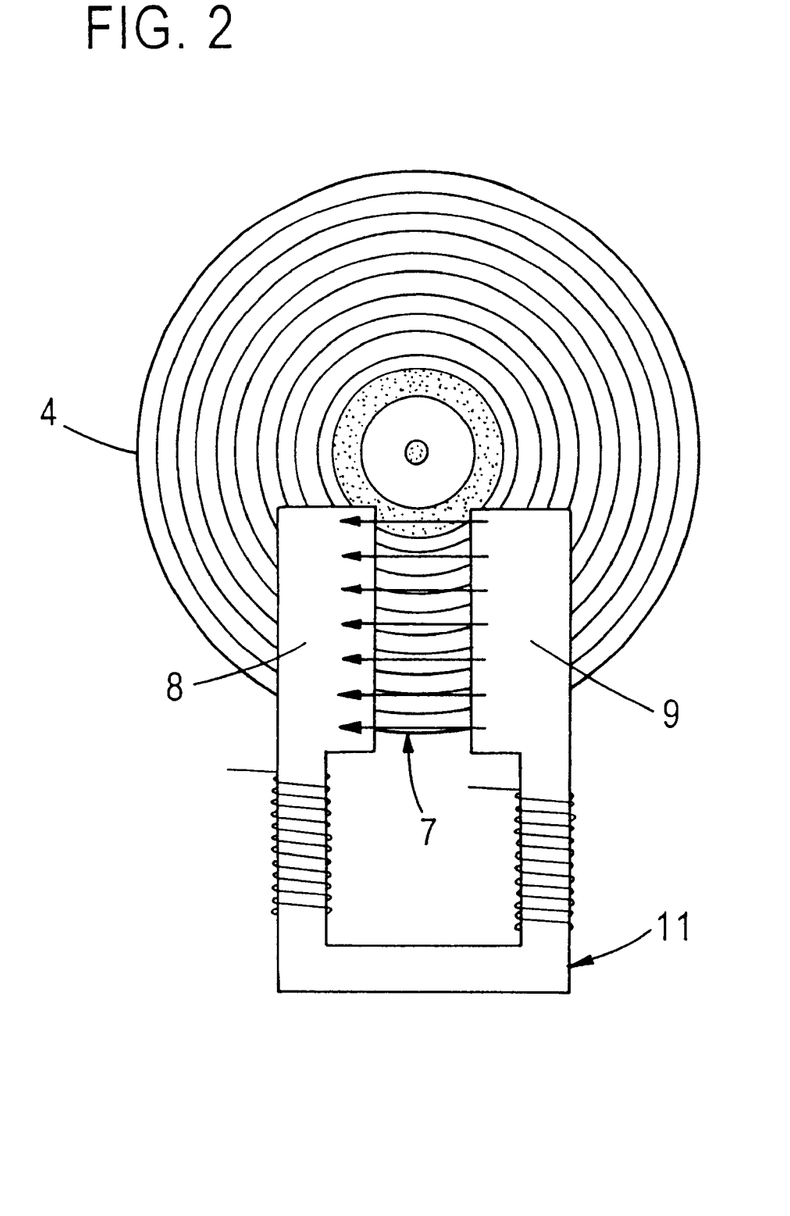
FIG. 2 is a simplified, schematic plan view of a magnet assembly of the apparatus of FIG. 1.

Referring also to the plan view of FIG. 2, in order to transfer the desired magnetic pattern to the disk surface, a strong magnetic field 7 having a uniform direction (indicated by the arrows in FIG. 1) is established over the surface of the magnetic disk 4 between poles 8 and 9 of horseshoe-shaped electromagnet 11 regulated by patterning control system 12. As described above, the strength of the uniform direction magnetic field 7 applied over the surface of the magnetic disk 4 is sufficient to result in pre-alignment of the magnetic regions or domains of the magnetic thin-film. The magnetic disk 4 is rotated by motor 13 through the magnetic field 7 such that each radial segment of the magnetic thin film thereof is exposed to the magnetic field 7 for an interval sufficient for each of the magnetic regions or grains to be aligned in the desired direction. The magnetic disk 4 can be rotated in a continuous fashion while being exposed to the magnetic field 7, or the disk may be rotated in discrete steps until all portions of the surface thereof have been exposed to the magnetic field 7.

After pre-alignment of the magnetic regions or grains of the magnetic disk 4 is completed, the patterning control system 12 effects a reversal in the direction of the magnetic field 7 and a reduction in the field strength to a level which is sufficient to alter the alignment of the magnetic regions or grains when the latter are at an elevated temperature equal to or greater than the Curie temperature ($T_c$) of the particular magnetic thin-film material, but is insufficient to alter the alignment of the magnetic regions or grains when the latter is at a temperature below $T_c$. To transfer the pattern from the mask 5 to the selected surface areas 4S of magnetic disk 4, the patterning control system 12 aligns the disk and the mask so that the mask pattern can be projected onto the appropriate area of the disk. The patterning control system 12 then activates radiative energy source 1 to optically project the pattern image onto the surface of the magnetic disk 4. The intensity of the focussed radiative energy 2 supplied by the combination of the radiative energy source 1 and the focussing lens 3 (and 6) is sufficient to increase the temperature of the irradiated selected surface areas 4S of the disk to a temperature equal to or greater than $T_c$ of the magnetic thin-film. The temperature of the selected surface areas 4S may be regulated by, inter alia, choice of the particular radiative source 1 and its power output, and duration of exposure to radiative energy from source 1. While the selected surface areas 4S are at or above $T_c$ as a result of the selective exposure to radiative energy, the lower strength, patterning magnetic field 7 applied to the medium surface by electromagnet 11 selectively re-aligns the orientation of the magnetic regions or grains of the selected surface areas 4S, the patterning magnetic field strength being insufficient to re-align the orientation at the unheated surface areas. Upon cessation of radiative energy supply to the selected surface areas 4S, the latter are allowed to cool down to below $T_c$, e.g., by conduction, convection, combinations thereof, or by active heat transfer, and the magnetic pattern is preserved in the surface of the magnetic thin-film layer of the disk.

After the mask pattern has been transferred to the selected exposed areas 4S of the disk 4, the patterning control system 12 re-positions the disk in order to permit pattern transfer to other portions of the disk surface. Alternatively, the mask 5 can be re-positioned, as by motor 14, to project the mask pattern on a different portion of the disk surface.

The type of mask 5 utilized in various implementations of the inventive methodology depends, inter alia, on the magnetic pattern feature sizes and the nature of the radiative energy source 2. For example, in a system 10 utilizing an ultra-violet ("UV") radiative energy source 2, the pattern mask 5 can be UV-transparent substrate (e.g., quartz) with pattern features formed in a 2–4 µm thick photographic emulsion, which features may be formed in the emulsion by standard photolithographic techniques. Alternatively, the mask may utilize a 1000–2000 Å thick coating of chromium (Cr) or iron oxide on a UV-transparent substrate.

In addition, while the invention contemplates the use of a wide variety of radiative energy sources 2, such as lasers, pulsed lasers, high-intensity lamps such as UV lamps, electron beam, and ion beam sources, the choice of radiative energy source for use in a particular application depends on various factors, such as the desired pattern resolution and the need to avoid deleterious changes in the disk thin film and any coatings thereon. Generally, shorter wavelength light sources provide greater resolution but incur a greater likelihood of damage to the magnetic thin film and/or any coating thereon. For example while a mercury (Hg) light source may provide a desired pattern feature resolution, it may possibly increase the risk of damage to the wear resistant, carbon (C)-based protective overcoat layer typically applied to the disk surface. In such event, a lower energy (i.e., longer wavelength) light source, such as an Argon laser operating in the green region, may be more appropriate.

Further, in other implementations of the inventive methodology, utilization of a contact patterning arrangement, rather than the illustrated projection-type arrangement, may be utilized. In such contact patterning arrangement, the pattern mask 5 (or its equivalent) may be placed in direct contact with the surface of the disk 4, thereby allowing the pattern image to be transferred to the selected surface areas 4S without requiring an optical projection system. In still other embodiments, both the disk and the mask may be simultaneously rotated during the patterning process; and in yet other embodiments, the radiative source 2, pattern mask 5, and lenses 3 and 6 may be replaced by a directly controllable radiative energy source such as a modulated laser.

The inventive methodology thus facilitates rapid, convenient, and technologically simplified fabrication of high quality, well-defined, patterned magnetic media at product throughput rates consistent with the throughput requirements of low-cost automated magnetic media manufacture. Moreover, the invention is not limited to use in forming any particular type of magnetic pattern or arrangement; rather the formation of all manner of magnetic patterns or arrangements is considered within the ambit of the present invention.

In the previous description, numerous specific details are set forth, such as specific materials, structures, processes, apparatus, etc., in order to provide a better understanding of the present invention. However, the present invention can be practiced without resorting to the details specifically set forth. In other instances, well-known processing techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concepts as expressed herein.

What is claimed is:

1. A method of forming a magnetic pattern in a magnetic data/information storage and retrieval medium, comprising the steps of:
    (a) providing a magnetic medium including a magnetic recording layer having a surface, said magnetic recording layer comprising a magnetic material having a Curie temperature ($T_c$) substantially above room temperature;
    (b) applying to said magnetic layer a first uniform magnetic field of a first direction and strength sufficient to substantially uniformize the magnetic state thereof;
    (c) applying to said magnetic layer a second uniform magnetic field of a second direction opposite to and of lesser strength than that of said first magnetic field, said strength of said second magnetic field being sufficient to alter the magnetic state of said magnetic layer when the latter is at a first, elevated temperature equal to or greater than $T_c$ but insufficient to alter said magnetic state of said magnetic layer when the latter is at a second, lower temperature below $T_c$;
    (d) selectively increasing the temperature of at least one selected portion of the surface area of said magnetic layer to at least $T_c$ for a desired interval, while applying said second magnetic field to said magnetic layer, thereby selectively altering the magnetic state of said at least one selected portion of said magnetic layer;
    (e) terminating application of said second magnetic field to said magnetic layer after completion of step (d); and
    (f) cooling the at least one selected portion of the magnetic layer to a temperature below $T_c$.

2. The method according to claim 1, wherein:
step (a) comprises providing a longitudinal or perpendicular magnetic medium wherein said magnetic layer is comprised of a magnetic alloy including metals selected from the group consisting of Fe, Co, Ni, Cr, and Pt, and $T_c$ of the magnetic alloy is on the order of about 300° C.

3. The method according to claim 2, wherein:
step (a) comprises providing a disk-shaped magnetic medium including a disk-shaped substrate supporting said magnetic layer.

4. The method according to claim 1, wherein:
step (b) comprises substantially uniformizing the magnetic state of said magnetic layer by pre-aligning the magnetic regions thereof.

5. The method according to claim 4, wherein:
step (b) comprises performing a DC erase by applying said first uniform magnetic field as a DC magnetic field directed along the easy axis of magnetization of said magnetic layer, the magnetic field strength of said first magnetic field being substantially greater than the DC coercivity of the magnetic layer at room temperature, and said first magnetic field is applied to the entire surface of the magnetic layer for a desired interval.

6. The method according to claim 1, wherein:
step (c) comprises applying said second uniform magnetic field of direction opposite to said first magnetic field at a strength which is lower than but close to that where lowering of the magnetization of the magnetic layer occurs as the temperature of the magnetic layer approaches $T_c$.

7. The method according to claim 6, wherein:
step (c) comprises applying a second uniform magnetic field at a strength determined by the following equation for magnetic materials with constant squareness (S) values:

$$\frac{H_c(dM/dH)_{Hc} - M_r}{(dM/dH)_{Hc} - (dM/dH)_0}$$

where: $H_c$=coercivity (Oe); M=magnetization (emu/mm$^3$); $M_r$=remanent magnetization; and subscript 0=zero applied magnetic field.

8. The method according to claim 1, wherein:
step (d) comprises increasing the temperature of a patterned plurality of selected portions of said surface of said magnetic layer to at least $T_c$.

9. The method according to claim 8, wherein:
step (d) comprises selectively exposing said patterned plurality of portions of said magnetic layer surface to radiative energy.

10. The method according to claim 9, wherein:
step (d) comprises generating a pattern of radiative energy for selectively exposing said patterned plurality of portions by projecting a focussed image on said selected portions of said surface of said magnetic layer via photolithographic techniques, by contact/proximity imaging through a patterned aperture mask, or by near field imaging.

11. The method according to claim 10, wherein:
step (d) comprises utilizing a source of radiative energy selected from among optical, electron beam, and ion beam sources.

12. The method according to claim 11, wherein:
step (d) comprises utilizing an optical radiative energy source selected from continuous and pulsed lasers.

13. The method according to claim 10, wherein:
step (d) comprises performing raster scanning or area imaging of said magnetic layer surface.

14. The method according to claim 1, wherein:
step (e) comprises rapidly cooling said at least one selected portion of said surface of said magnetic layer by at least one process selected from convection, conduction, and heat transfer.

15. A patterned magnetic medium, comprising:
(a) a substrate; and
(b) a patterned magnetic recording layer on said substrate, said patterned magnetic recording layer having a Curie temperature ($T_c$) substantially above room temperature and a surface comprising a magnetic pattern formed therein by a process comprising the steps of:
   i. applying to the easy axis of said magnetic layer a first uniform magnetic field of a first direction and having sufficient strength to substantially uniformize the magnetic state of the magnetic layer by pre-alignment of the magnetic regions thereof;
   ii. applying to the magnetic layer a second uniform magnetic field of a second direction opposite to and having a strength less than that of said first magnetic field, said second strength of said second magnetic field being sufficient to alter the alignment of said magnetic regions of said magnetic layer when the latter is at a first, elevated temperature equal to or greater than $T_c$ but insufficient to alter said magnetic regions of said magnetic layer when the latter is at a second, lower temperature below $T_c$;
   iii. selectively increasing the temperature of a patterned plurality of selected portions of the surface area of said magnetic layer to at least $T_c$ for a desired interval while applying said second magnetic field to said magnetic layer, thereby selectively altering the magnetic alignment of said magnetic regions of said patterned plurality of selected portions of said magnetic layer;
   iv. terminating application of said second magnetic field to said magnetic layer after completion of step iii.; and
   v. cooling the patterned plurality of selected portions to a temperature below $T_c$.

16. The patterned magnetic medium according to claim 15, comprising a longitudinal or perpendicular magnetic recording layer comprised of a magnetic alloy including metals selected from the group consisting of Fe, Co, Ni, Cr, and Pt and having a $T_c$ on the order of about 300° C.

17. The patterned magnetic medium according to claim 16, comprising a disk-shaped substrate.

18. A system for forming a magnetic data/information storage and retrieval medium having a patterned magnetic recording layer, comprising:
a magnetic means for applying a uniform magnetic field of a desired direction to a magnetic recording layer having a Curie temperature ($T_c$) which is substantially above room temperature to place said magnetic layer in a particular magnetic state; and
a means for forming a magnetic pattern in said magnetic layer by selectively increasing the temperature of a selected plurality of portions of a surface of said magnetic layer to at least $T_c$ for a desired interval,
wherein said magnetic means has sufficient strength to alter the magnetic state of said magnetic layer when the magnetic layer is at a first, elevated temperature at or above $T_c$, but insufficient to alter said magnetic state of said magnetic layer when the magnetic layer is at a second, lower temperature below $T_c$.

19. The system according to claim 18, wherein:

said means for forming a pattern includes a radiative energy source for selectively increasing the temperature of said selected plurality of portions of said surface area of said magnetic layer to a temperature of $T_c$ or above.

* * * * *